United States Patent [19]

Williams

[11] Patent Number: 4,791,823

[45] Date of Patent: Dec. 20, 1988

[54] VOLTAGE DETECTOR APPARATUS

[76] Inventor: Robert A. Williams, 2721 White Settlement Rd., Fort Worth, Tex. 76107

[21] Appl. No.: 72,998

[22] Filed: Jul. 13, 1987

[51] Int. Cl.⁴ ........................ F16H 35/18; G05G 1/10; G01D 13/12

[52] U.S. Cl. ........................................ 74/10.8; 74/504; 74/553; 116/298

[58] Field of Search .................. 74/10.8, 98, 413, 504, 74/553; 116/284, 295, 298

[56] References Cited

U.S. PATENT DOCUMENTS

| | | | |
|---|---|---|---|
| 304,924 | 9/1884 | Freese | 74/413 |
| 2,270,653 | 1/1942 | Harazim | 116/298 |
| 2,360,137 | 10/1944 | Jennings | 74/413 |
| 2,819,698 | 1/1958 | Kirsten | 74/504 |
| 2,980,055 | 4/1961 | Burns | 116/298 |
| 3,065,728 | 11/1962 | Kirsten | 116/295 |
| 4,197,765 | 4/1980 | Shimoda | 74/553 |

FOREIGN PATENT DOCUMENTS

| | | | |
|---|---|---|---|
| 151138 | 9/1920 | United Kingdom | 74/553 |
| 197911 | 6/1924 | United Kingdom | 74/10.8 |

*Primary Examiner*—Lawrence Staab
*Attorney, Agent, or Firm*—Arthur F. Zobal

[57] ABSTRACT

A mount is secured to an end of a cylindrical housing with a front side facing outward thereof. A knob is provided having a stem extending from one end and a gear secured to and extending radially outward from the end of the knob. An aperture is formed through the mount for receiving the stem of the knob with the knob located on the front side of the mount near one edge thereof. A generally cylindrical shaped face member has an inner side secured to the front side of the mount and an outer side facing outward thereof. The face member has an opening formed therethrough for receiving the knob and its gear such that the knob may be viewed from the opening from the outer side of the face member. The opening of the face member extends to one edge thereof such that a portion of the gear is accessable from the edge. An annular member is located around the face member and is supported by the face member for rotation in opposite directions relative to the face member. The annular member has gear teeth in mesh with the teeth of the gear of the knob for causing the knob gear and hence the knob to rotate when the annular member is rotated relative to the face member.

A stop and a slot are provided on the annular member and face member respectively or vice versa for limiting rotation of the annular member in opposite directions relative to the face member.

4 Claims, 4 Drawing Sheets

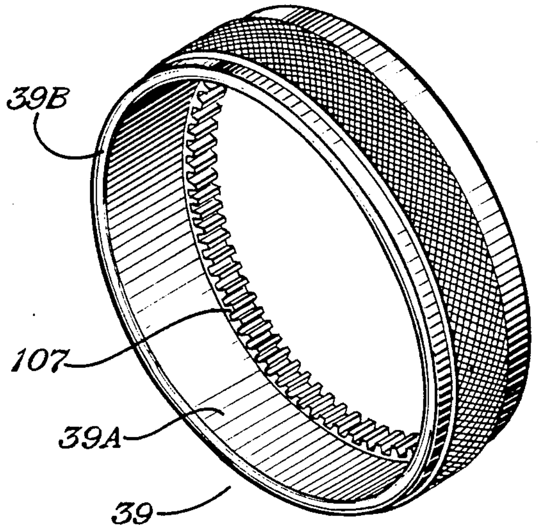
Fig.15
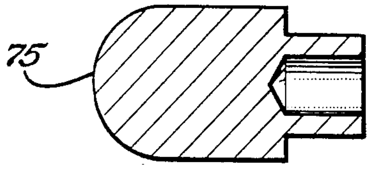
Fig.9
Fig.16
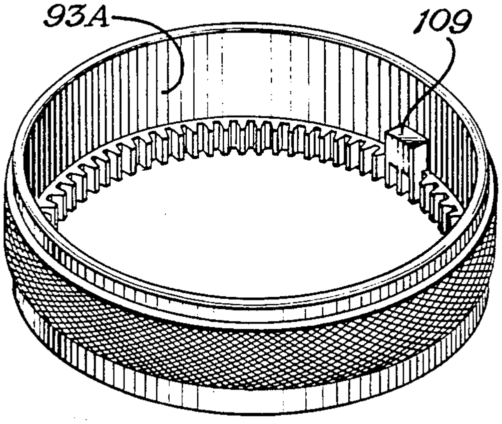
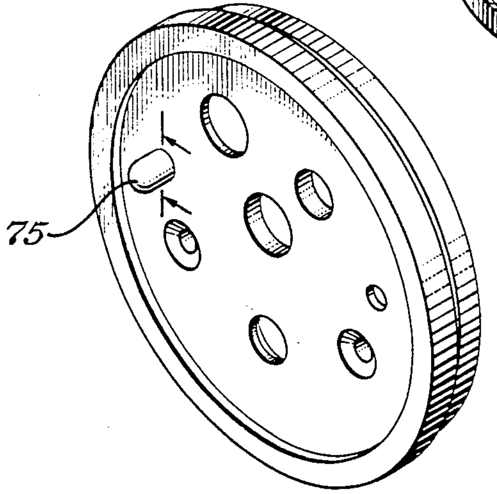
Fig.7
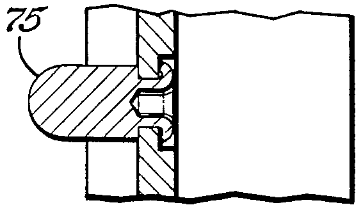
Fig.8

VOLTAGE DETECTOR APPARATUS

BACKGROUND OF THE INVENTION

A known voltage detector is supported in a cylindrical housing and has a rotatable knob supported at a front end which may be rotated to different positions for carrying out different tests. The knob extends outward from the face of the front end. Problems have occured in that the knob is readily broken rendering the detector useless.

SUMMARY OF THE INVENTION

It is an object of the invention to provide an apparatus that can be retrofitted to the housing of the voltage detector which provides a protected, rotatable knob that is easy to operate and to view.

The apparatus comprises mount means secured to an end of the housing with a front side facing outward thereof. A knob is provided having a stem extending from one end and a gear means secured to and extending radially outward from said knob. An aperture is formed through said mount means for receiving said stem of said knob with said knob located on the front side of said mount means near one edge thereof. A generally cylindrical shaped face member has an inner side secured to the front side of said mount means and an outer side facing outward thereof. The face member has an opening formed therethrough for receiving said knob and said gear means such that said knob may be viewed from said opening from the outer side of said face member and said opening of said face member extends to one edge thereof such that a portion of said gear means is accessable from said one edge. An annular member is located around said face member and is supported by said face member for rotation in opposite directions relative to said face member. Said annular member has gear teeth which mesh with the teeth of said gear means for causing said gear means and hence said knob to rotate when said annular member is rotated relative to said face member.

In a further aspect, said annular member and said face member each comprise means for engaging each other when said annular member is rotated between given angular positions relative to said face member for limiting rotation of said annular member in opposite directions relative to said face member.

In another aspect, said face member is removably secured to said mount means.

BRIEF DESCRIPTION OF THE DRAWINGS

FIG. 7 is an isotrometric front view of the mount of FIG. 5 showing an aligning pin connected thereto.

FIG. 8 is a cross-sectional view of FIG. 7 taken along the lines 7—7 thereof.

FIG. 9 is a cross-sectional view of the pin shown in FIG. 8 before attachment to the mount.

FIG. 15 is an isometric front view of an annular member of the apparatus of the invention with internal gear teeth.

FIG. 16 is another isotrometric front view of the annular member of FIG. 15 turned to illustrate a stop member on its interior wall.

DESCRIPTION OF THE PREFERRED EMBODIMENTS

Figure 1:
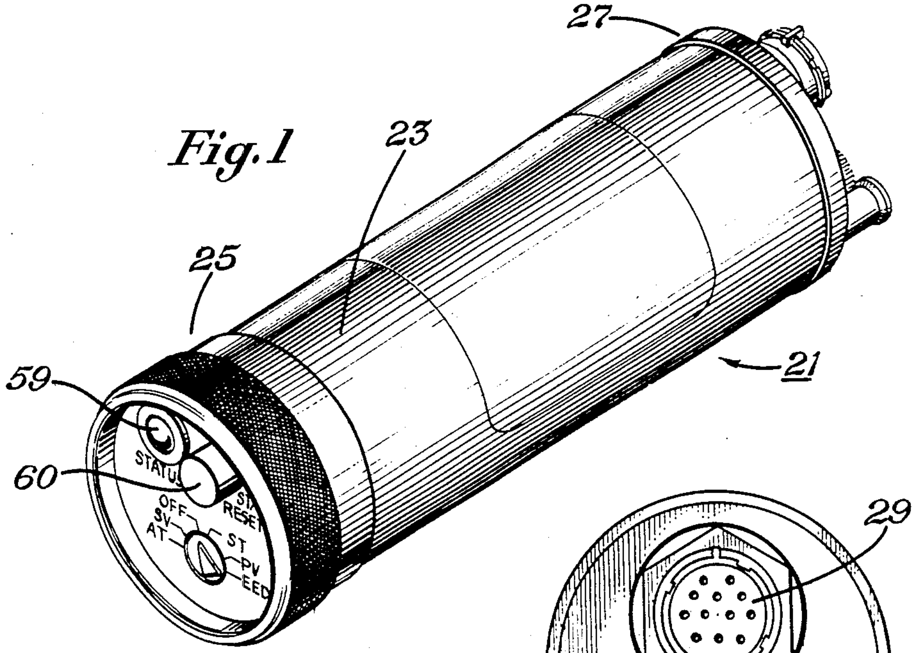
FIG. 1 is an isometric view of a voltage detector having the apparatus of the invention retrofitted to its front end.
Figure 2:
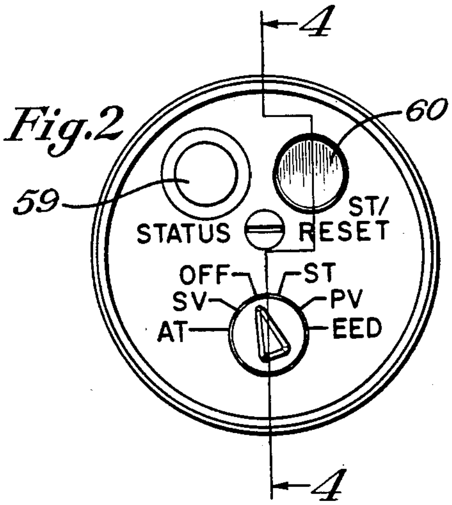
FIG. 2 is a front view of the apparatus of the invention retrofitted to the voltage detector.
Figure 3:
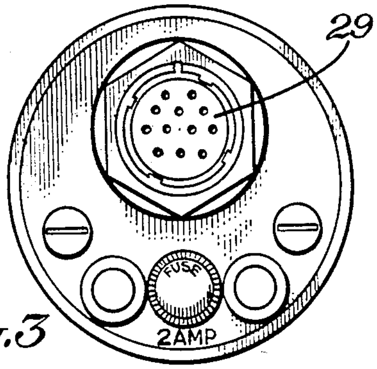
FIG. 3 is a rear end view of the voltage detector.
Figure 10:
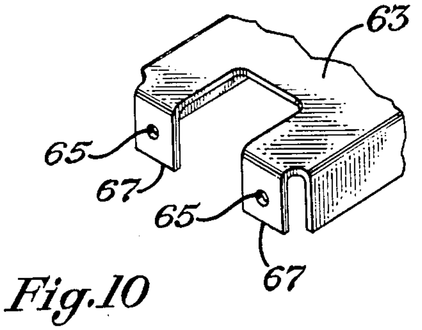
FIG. 10 illustrates structure to which the mount is attached.

Referring to FIGS. 1 an 3 of the drawings, reference numeral 21 identifies a voltage detector having its front end retrofitted with the apparatus of the invention. The voltage detector comprises electrical components supported in a hollow cylindrical shaped housing 23 having a front end 25 and a rear end 27. The rear end 27 has an electrical terminal 29 with sockets for receiving pins of electrical leads to be connected to the equipment to be tested. The housing 23, the electrical components therein and its rear end 27 are part of an existing device. The existing device also has a rotatable dial or knob at its front end for selecting certain test conditions. In addition, it has an indicating lamp and a set/reset switch. The knob extends outward from a face plate member and is readily broken off rendering the detector useless.

In accordance with my invention, I have removed the original face plate member and knob and have provided an apparatus that can be retrofitted to the front end of the housing which provides a protected, rotatable knob that is easy to operate and to view. The apparatus also allows use of the indicating lamp and set/reset switch.

Figure 4:
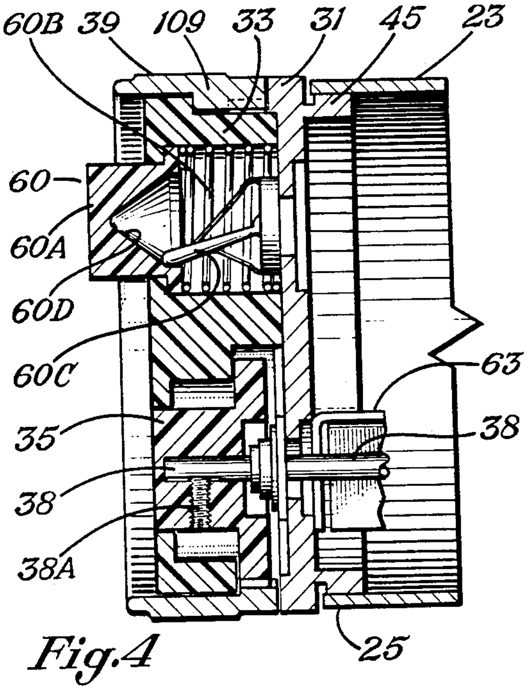
FIG. 4 is a cross-sectional view of FIG. 2 taken along the lines 4—4 thereof.
Figure 5:
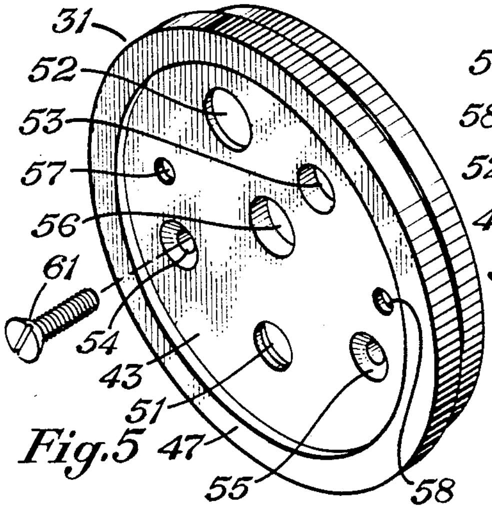
FIG. 5 is an isotrometric front view of the mount of the apparatus of the invention.
Figure 6:
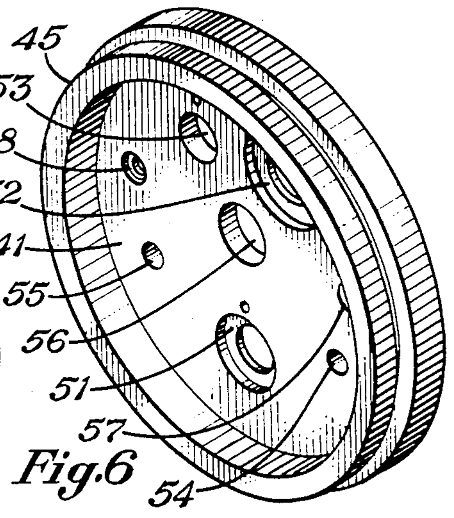
FIG. 6 is an isotrometric rear view of the mount of FIG. 5.
Figure 17:
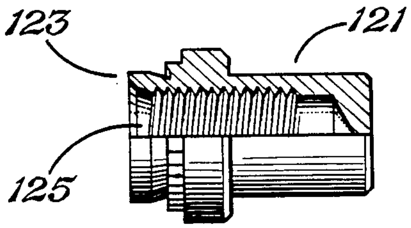
FIG. 17 is an enlarged partial cross-sectional view of an insert member with a threaded aperture.

The apparatus of the invention comprises a mount member 31, a face member 33, a knob 35 with a gear 37, and an annular member 39 with inside gear teeth 107. The mount member 31 is circular in shape and has inward and outward facing sides 41 and 43 respectively. A smaller diameter rim 45 extends from its inward side 41. The rim 45 is adapted to be located inside of the front end 25 of the housing 23 as shown in FIG. 4. A rim 47 also extends from the side 43 of the mount 31 at its outer edge. Formed through the mount 31 are eight apertures 51–58. Aperture 51 is for the stem 38 of the knob 35; aperture 52 is for the indicating lamp; and aperture 53 is for the set/reset switch. The stem 38 is attached to the knob 35 by a set screw 38A. Apertures 54 and 55 receive attaching bolts 61 (only one of which is shown) for attaching the mount 31 to interior support structure 63 located and secured in the housing 23. The bolts 61 are screwed into threaded apertures 65 formed in arms 67 of the interior structure 63 for securing the mount 31 to the interior structure 63. Apertures 57 and 58 have aligning pins 75 secured therein (only one of which is shown in FIG. 7) for maintaining the face member 33 properly aligned with respect to mount 31. The indicating lamp is shown at 59 and the set/reset switch is shown at 60. They are part of the original equipment. An insert 121 (see FIG. 17) has its front end 123 press fitted into the aperture 56 from the back side of member 31. A threaded opening 125 is formed into the front end 123 of the insert 121 for receiving the threaded shank of a bolt 6 which extends through an aperture 106 formed through the face member 33 for removably securing the face member 33 to the mount 31.

Figure 11:
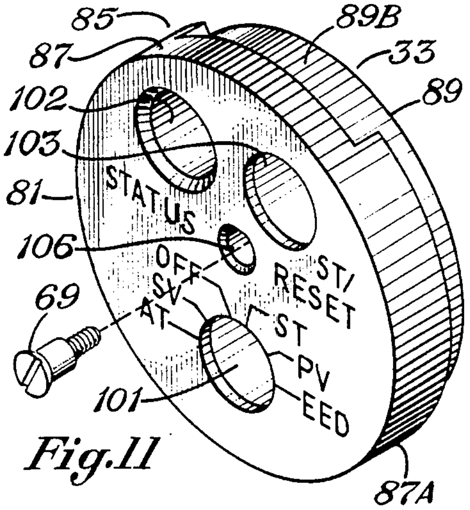
FIG. 11 is an isotrometric front view of the face member of the apparatus of the invention.
Figure 12:
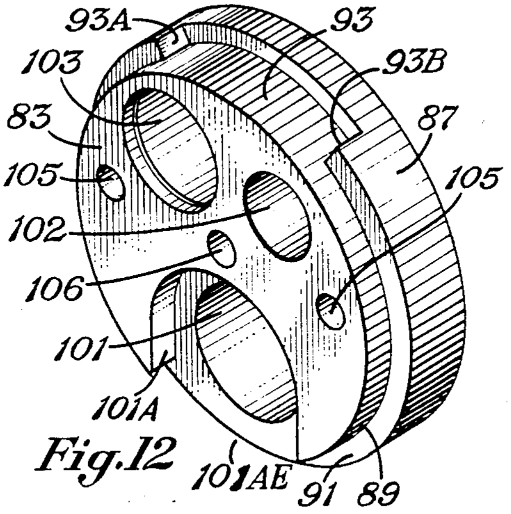
FIG. 12 is an isotrometric rear view of the face member of FIG. 11.
Figure 13:
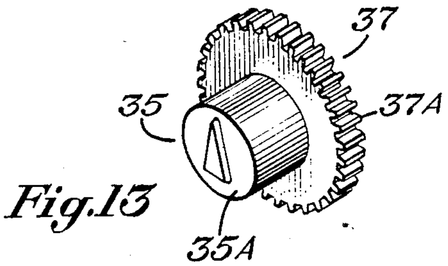
FIG. 13 is an isotrometric front view of the knob and its gear of the apparatus of the invention.
Figure 14:
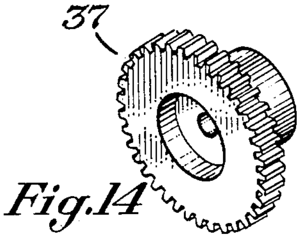
FIG. 14 is an isotrometric rear view of the knob and gear of FIG. 13.

The face member 33 is generally cylindrical in shape and has a front side 81 and a back side 83. The front side 81 serves as a face and has indicia written thereon as shown in FIG. 11. The round peripheral edge 85 of the member 33 has a forward portion 87 and a rear portion 89 with the forward portion 87 having a larger diameter than the rear portion 89. A shoulder 91 extends between the portions 87 and 89 and an arcuate slot 93 is formed in the forward portion 87 and extends forward from the shoulder 91. The two edges 93A and 93B of the slot 93 define the angular limits of the arc of the slot 93 relative to the axis of the member 33.

Apertures 101, 102, 103, and 106 are formed through the member 33 and are basically to be aligned with apertures 51, 52, 53, and 56 respectively of the mount 31 when the face member 33 is secured to the mount 31. Apertures 101, 102, and 103 are sized to receive the knob assembly 35, 37; the lamp 59; and the switch 60 respectively. The rear end 83 of the member 33 is adapated to be located against the front end 43 of the member 31 inside of its rim 47 with the knob assembly 35, 37, the lamp 59 and the switch 60 located in apertures 101, 102, and 103 respectively. The rear end 83 of the member 33 has two apertures 105 for receiving the pins 75 of member 31 for insuring that apertures 101, 102, 103, and 106 are aligned with apertures 51, 52, 53, and 56 respectively, ween the rear end 83 of the member 33 is seated against the front end 41 of the member 31. Bolt 69 then may be inserted through aperture 106 and 56 and screwed into the aperture 125 of insert 121 to secure member 33 to member 31.

FIG. 4 illustrates the rear end 83 of the member 33 seated against the front end 43 of the member 31 such that apertures 101, 102, 103, and 106 are aligned with apertures 51, 52, 53, and 56 respectively.

The aperture 101 has a shape and size sufficient to receive the knob 35, its gear 37 and its stem 38 from its backside 83 with the front face 35A of the knob 35 being viewable through aperture 101 from the front side 81 of the member 33. The aperture 102 has a shape and size sufficient to receive the lamp 59 with the front of the lamp 59 extending therethrough and beyond the front side 81 such that it is viewable from the front side 81. The aperture 103 has a shape and size sufficient to receive the switch 60. The original switch 60 comprises a switch actuated by a lever 60C or by a push button employed in lieu of the lever. I have added a push button 60A extending through aperture 103 beyond the front side of the member 33. The button 60A is urged normally outward by a spring 60B. The lever 60C or original push button of the switch 60 is moved by the cone shaped surface 60D formed in the button 60A when the button 60A is pushed inward for actuating the switch 60.

The openings 51 and 101 are located near one edge of each of members 31 and 33 respectively. The back portion 101A of the opening 101 extends to the edge of the rear portion 83 of face member 33 such that the opening portion 101A is accessable from the edge of the rear portion 83 by way of the edge opening 101AE.

The gear 37 extends radially outward from the rear end of the knob 35. When located in place in the aperture 101, the teeth 37A of the gear 37 are accessable from the edge of the member 83 by way of the edge opening 101AE.

The annular member 39 has located on its inside at its rear end, gear teeth 107 which extends radially inward from inside wall 39A. The member 39 is adapted to be located around face member 33 with its front portion 39B located around the front peripheral edge 87A of member 33 and its teeth 107 located around the rear peripheral edge 89B of member 33. In this position, the teeth 107 of member 39 mesh with the teeth 37A of the gear 37 through the edge opening 101AE such that when member 39 is rotated, it rotates the gear 37 and hence the knob 35.

Due to the structure of members 31, 33, and 39, the annular member 39 is held in place around the member 33 and cannot be removed unless the member 33 is removed. Member 33 fully protects the knob 35, yet the knob can be readily viewed from the front end of the member 33 and rotated to the desired position by rotating member 39.

As seen in FIG. 16, a stop 109 is located on the inside of the member 39 radially inward from the inside wall 39A and forward of its teeth 107. The stop 109 fits within the slot 93 of member 33 and the two edges 93A and 93B of the slot 93 limit the amount of angular rotation of member 39 and hence of the knob 35 in opposite directions by engaging the stop 109 as the member 39 is rotated in opposite directions to positions approximately corresponding with the positions AT and EED on the front face 81 of the member 33. By rotating the knob 35 to the various positions AT, SV, ST, PV, EED, various tests can be carried out on the equipment to be tested. When the knob or dial 37 is rotated to the OFF position, the detector is turned off.

Figure 18:
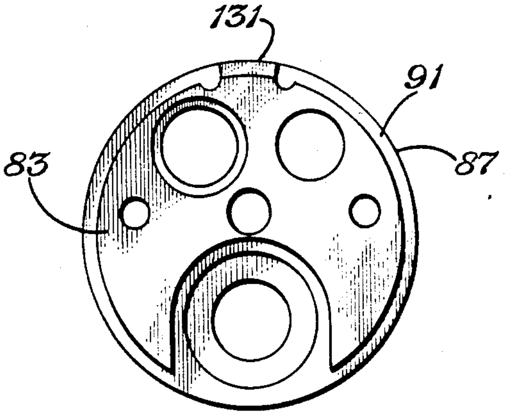
FIG. 18 is a rear view of the face member of FIGS. 11 and 12 modified to have a stop formed on its edge.
Figure 19:
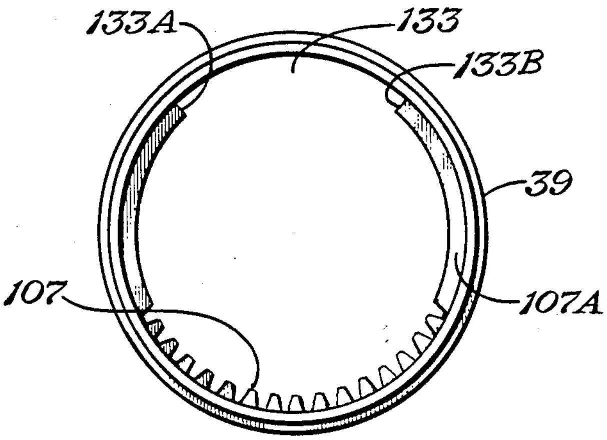
FIG. 19 is a front view of the annular member of FIGS. 15 and 16 modified to have an inside slot formed in an inner rim from which its gear teeth are formed.

Referring to FIGS. 18 and 19, the peripheral edge of the face member 33 has been modified whereby there is no slot 93 and a stop member 131 extends rearward from the shoulder 91 to the back side 83. The arc of the stop 131 is about 18° relative to the axis of the member 33. The annular member 39 has been modified such that the teeth 107 do not extend 360° on the inside of the member 39 and the rim 107A in which the teeth 107 are formed has a arcuate slot 133 of about 84° formed therein relative to the axis of the member 99. The teeth 107 extend in an arc greater than the arc of the slot 133. The annular member 39 is located around the face member 33 such that the stop 131 of face member 33 is located in the slot 133 formed in the annular member 39. Upon rotation of the annular member 39 in opposite directions relative to the face member 33 the edges 133A and 133B of the structure defining the slot 133 engage the stop 131 to limit rotation of the annular member 39 to about 66° relative to the face member 33.

The bulb 59 may be readily replaced by removing bolt 69 and the face member 33.

Although the apparatus of the invention was described as being retrofitted to the front end of the housing of the voltage detector, it is to be understood that the voltage detector could be constructed employing the apparatus of the invention as part of the original equipment.

I claim:

1. Apparatus for turning a knob of a device, comprising:

a housing member having first and second ends, mount means secured to said first end of said housing member with a front side facing outward thereof, a knob having a stem extending from one end and a gear means, with teeth, secured to and extending radially outward from said knob, an aperture formed through said mount means for receiving said stem of said knob with said knob located on the front side of said mount means near one edge thereof, a generally cylindrical shaped face member having an inner side secured to the front side of said mount means and an outer side facing outward thereof, said face member having an opening formed therethrough for receiving said knob and said gear means such that said knob may be viewed in said opening from the outer side of said face member with said opening of said face member extending to one edge thereof such that a portion of said gear means is accessable from said one edge of said face member, an annular member located around said face member and supported by said face member for rotation in opposite directions relative to said face member, said annular member having gear teeth which mesh with the teeth of said gear means for causing said gear means and hence said knob to rotate when said annular member is rotated relative to said face member.

2. The apparatus of claim 1, wherein:

said annular member and said face member each comprise means for engaging each other when said annular member is rotated between given angular positions relative to said face member for limiting rotation of said annular member in opposite directions relative to said face member.

3. The apparatus of claim 1, comprising:

means for removably securing said face member to said mount means.

4. The apparatus of claim 2, comprising:

means for removably securing said face member to said mount means.

* * * * *